United States Patent [19]
Konishi

[11] Patent Number: 5,784,100
[45] Date of Patent: Jul. 21, 1998

[54] APPARATUS AND METHOD FOR PERFORMING SHADING CORRECTION BY MULTIPLYING A DIFFERENTIAL SHADING CORRECTION FACTOR AND INPUT IMAGE DATA

[75] Inventor: Masahiro Konishi, Asaka, Japan

[73] Assignee: Fuji Photo Film Co. Ltd., Kanagawa, Japan

[21] Appl. No.: 515,229

[22] Filed: Aug. 15, 1995

[30] Foreign Application Priority Data

Aug. 18, 1994 [JP] Japan .................. 6-215272

[51] Int. Cl.⁶ .................................................. H04N 3/14
[52] U.S. Cl. .................................. 348/251; 348/241
[58] Field of Search .......................... 348/251, 241, 348/247, 250; 358/461

[56] References Cited

U.S. PATENT DOCUMENTS

| | | |
|---|---|---|
| 4,473,844 | 9/1984 | Klein ........................ 348/251 |
| 4,979,042 | 12/1990 | Vogel ........................ 348/251 |
| 5,001,768 | 3/1991 | Mita et al. ................ 358/461 |
| 5,047,861 | 9/1991 | Houchin et al. ......... 348/251 |
| 5,289,286 | 2/1994 | Nakamura et al. ...... 348/251 |

FOREIGN PATENT DOCUMENTS 05-276376 10/1993 Japan .................. H04N 1/40

*Primary Examiner*—Wendy Garber

[57] ABSTRACT

Shading correction is achieved with high precision while reducing the amount of data representing a correction factor for shading correction. A correction factor $C(x-1)$ at a pixel address "$x-1$" is held in a latch circuit. The correction factor $C(x-1)$ is fed to an adding circuit through a changeover switch. A differential correction factor $V(x)$ representing the difference between the correction factor $C(x-1)$ for a pixel addressed by "$x-1$" and a correction factor $C(x)$ for a pixel addressed by "$x$" is read out from a differential correction factor memory, and is fed to the adding circuit. The correction factor $C(x-1)$ and the differential correction factor $V(x)$ are added together in the adding circuit, and data obtained by the addition $C(x-1)+V(x)$ is outputted as the correction factor $C(x)$ at a pixel address "$x$".

3 Claims, 5 Drawing Sheets

APPARATUS AND METHOD FOR PERFORMING SHADING CORRECTION BY MULTIPLYING A DIFFERENTIAL SHADING CORRECTION FACTOR AND INPUT IMAGE DATA

BACKGROUND OF THE INVENTION

1. Field of the Invention

The present invention relates to a circuit for calculating a correction factor for correcting (compensating) shading occurring due to nonuniformity in illumination, for example; a shading correction factor calculating method; and a shading correction factor holding method.

2. Description of the Background Art

Even when an object is imaged, the surface of which is uniform in luminance or lightness is imaged, the lightness of an image obtained by the imaging may, in some cases, be nonuniform due to the nonuniformity in illumination or the nonuniform illuminating characteristics of a lighting apparatus. Such a phenomenon is referred to as shading.

When shading occurs, the shading may, in some cases, prevent the subsequent processing. Shading correction is so made that the lightness of the image obtained by the imaging becomes uniform. A pure white object and a black object are imaged, factors for shading correction are previously created on the basis of image data obtained by the imaging, and the created correction factors are stored. The image data obtained by imaging an object is subjected to shading correction for each pixel using the shading correction factor stored. An attempt to make shading correction with high precision increases the amount of data representing the factor for shading correction. For example, it is assumed that image data representing an image has gray levels expressed by 8-bits. In this case, the data representing the shading correction factor requires 8-bit precision. The amount of the image data and the amount of the data representing the shading correction factor become approximately equal, whereby a large-capacity memory is required to store the shading correction factor. Consequently, a system for shading correction may, in some cases, be increased in size.

SUMMARY OF THE INVENTION

An object of the present invention is to achieve shading correction with high precision while reducing the amount of data representing a factor for shading correction.

A shading correction factor generating apparatus according to the present invention comprises first storing means for storing an initial correction factor; second storing means for storing a differential correction factor for each pixel; temporary holding means for temporarily holding a calculated correction factor; and means for calculating for each pixel the sum of the differential correction factor stored in the second storing means and the initial correction factor stored in the first storing means or the correction factor held in the temporary holding means, outputting the result of the calculation as a correction factor, and causing the temporary holding means to hold the result of the calculation.

A shading correction factor generating circuit according to the present invention comprises a first memory storing at least one initial correction factor; a differential correction factor memory storing for each pixel a differential correction factor representing the difference between a shading correction factor for the pixel and a shading correction factor for a pixel adjacent thereto and outputting the stored differential correction factor in synchronization with a pixel clock pulse fed; adding circuit means for adding the differential correction factor read out from the differential correction factor memory and the initial correction factor or a correction factor found the preceding time and outputting the result of the addition as a correction factor; correction factor holding circuit means for holding the correction factor outputted from the adding circuit means during one pixel clock pulse; and feedback circuit means for giving the correction factor outputted from the factor holding circuit means as the preceding correction factor to the adding circuit.

A shading correction factor generating method according to the present invention comprises the steps of storing data representing an initial correction factor and storing for each pixel data representing a differential correction factor representing the difference between correction factors; successively reading out the stored data representing the differential correction factor; adding the read data representing the differential correction factor and the stored data representing the initial correction factor or data representing a correction factor found the preceding time; outputting data obtained by the addition as data representing a correction factor; and feeding back the data obtained by the addition for the addition processing.

According to the present invention, the differential correction factor representing the difference between correction factors is stored for each pixel. The stored initial correction factor and the differential correction factor for the first pixel are first added up. A correction factor obtained by the addition is outputted as a correction factor, and is fed back for the subsequent addition processing. The fed back correction factor and a differential correction factor for the succeeding pixel are added up, to thereby to obtain a correction factor for the succeeding pixel. The feedback processing and the addition processing are repeated.

All correction factors need not be stored in order to obtain a correction factor. The initial correction factor and the differential correction factor may only be stored. The image data hardly varies by shading between the adjacent pixels. Consequently, the amount of data representing the differential correction factor becomes smaller than the amount of data representing the correction factor. Therefore, the differential correction factor can be stored using a small-capacity memory, to thereby to make it possible to miniaturize a system for shading correction while allowing effective shading correction.

A shading correction factor holding method according to the present invention comprises the steps of finding a correction factor for shading correction with respect to all pixels constituting one image; determining at least one initial correction factor for an add operation; calculating for each pixel a differential correction factor representing the difference between a correction factor for the pixel and a correction factor for a pixel adjacent thereto with respect to all the pixels constituting the one image; and storing the determined initial correction factor and the calculated differential correction factor.

According to the present invention, the initial correction factor and the differential correction factor are stored. A correction factor is obtained by adding up the initial correction factor and the differential correction factor or adding up a correction factor obtained by the previous addition and the differential correction factor.

All correction factors need not be stored in order to obtain a correction factor. The initial correction factor and the differential correction factor may only be stored. The image data hardly varies by shading between the adjacent pixels.

Consequently, the amount of data representing the differential correction factor becomes smaller than the amount of data representing the correction factor. Therefore, the differential correction factor can be stored using a small-capacity memory, to thereby to make it possible to miniaturize a system for shading correction.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
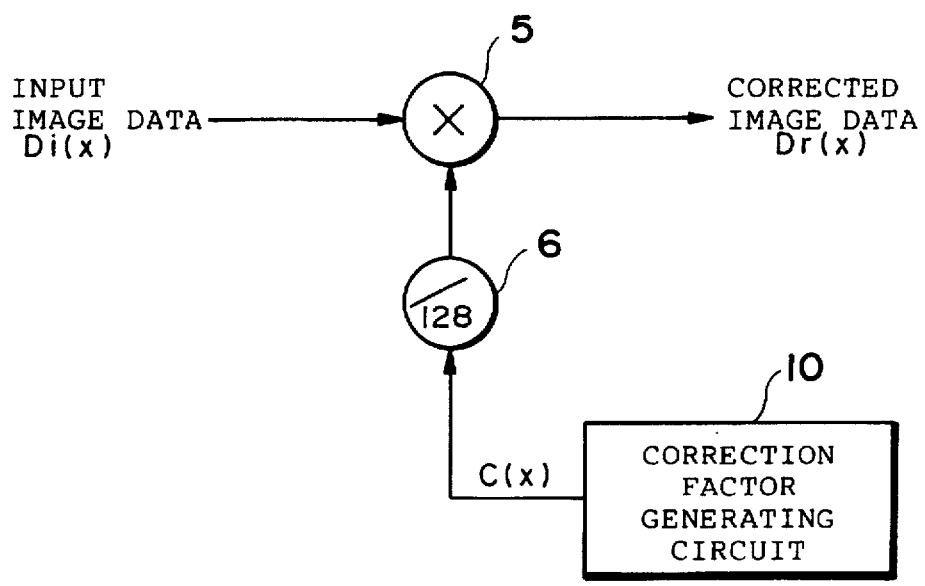
FIG. 1 illustrates the principle of shading correction.
Figure 2B:
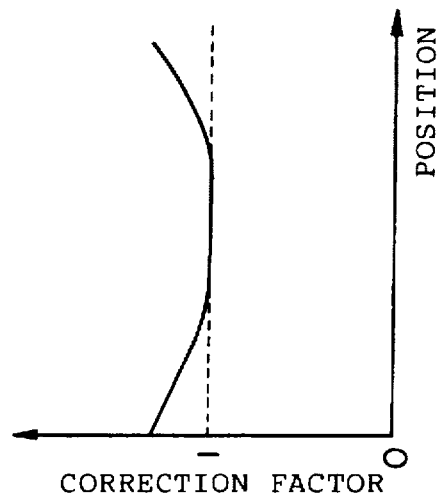
FIG. 2b illustrates the level of a correction factor.
Figure 2A:
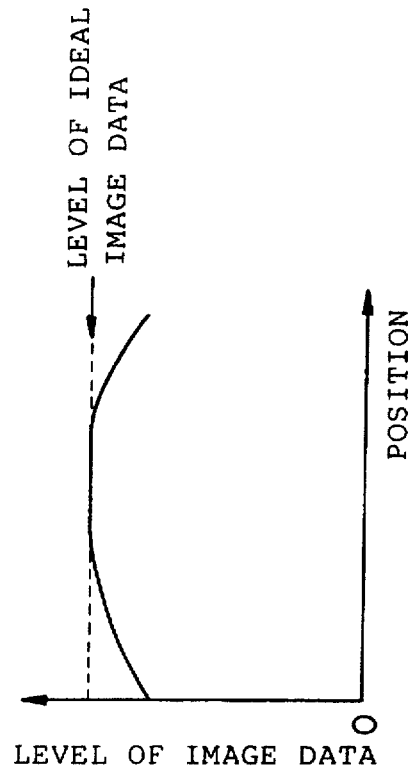
FIG. 2a illustrates the level of image data obtained when a reference object is imaged, the surface of which is uniform in luminance or lightness.

FIG. 1 illustrates the principle of shading correction (shading compensation). FIG. 2a illustrates the level of image data obtained by imaging a reference object, the surface of which is uniform in luminance or lightness, and FIG. 2b illustrates a shading correction factor (coefficient) for shading correction. The horizontal axis indicates the position (coordinates) of a pixel in the X direction or the Y direction of an image.

Referring to FIG. 2a, the level of image data obtained by actually imaging a reference object, the surface of which is uniform in luminance or lightness, is not the same as the level of ideal image data (the level which is constant irrespective of the location) due to shading. That is, the level may be partly low or high. In such a case, the shading may, in some cases, prevent accurate processing of the image data. This is the reason why shading correction is needed and made.

Although the correction of the level of the image data is generally made with respect to luminance data, it may also be made with respect to R (red), G (green) and B (blue), i.e., primary-color data.

Referring to FIG. 1, image data obtained by imaging a reference object, the surface of which is uniform in luminance or lightness, is fed as input image data Di(x) to a multiplying circuit 5. Data representing a shading correction factor (coefficient) C(x) outputted from a correction factor generating circuit 10 is divided by 128 in a dividing circuit 6, after which the result of the division is input to the multiplying circuit 5. The correction factor C(x) is divided by 128 in the dividing circuit 6 in order to return the correction factor C(x) which has been obtained by multiplying by 128 so as to have 8-bit significant digits to its original value, as described later.

The input image data Di(x) and the data representing the shading correction factor C(x) divided by 128 are multiplied together in the multiplying circuit 5, to thereby to obtain image data Dr(x) which is subjected to shading correction.

The shading correction factor C(x) and the level of the input image data shown in FIG. 2a are symmetric with respect to a straight line, as shown in FIG. 2b. The input image data Di(x) is multiplied by the shading correction factor C(x), to thereby to make the level of the image data a constant level. The shading correction factor C(x) is calculated in the correction factor generating circuit 10. The calculating method will be described later.

Figure 3:
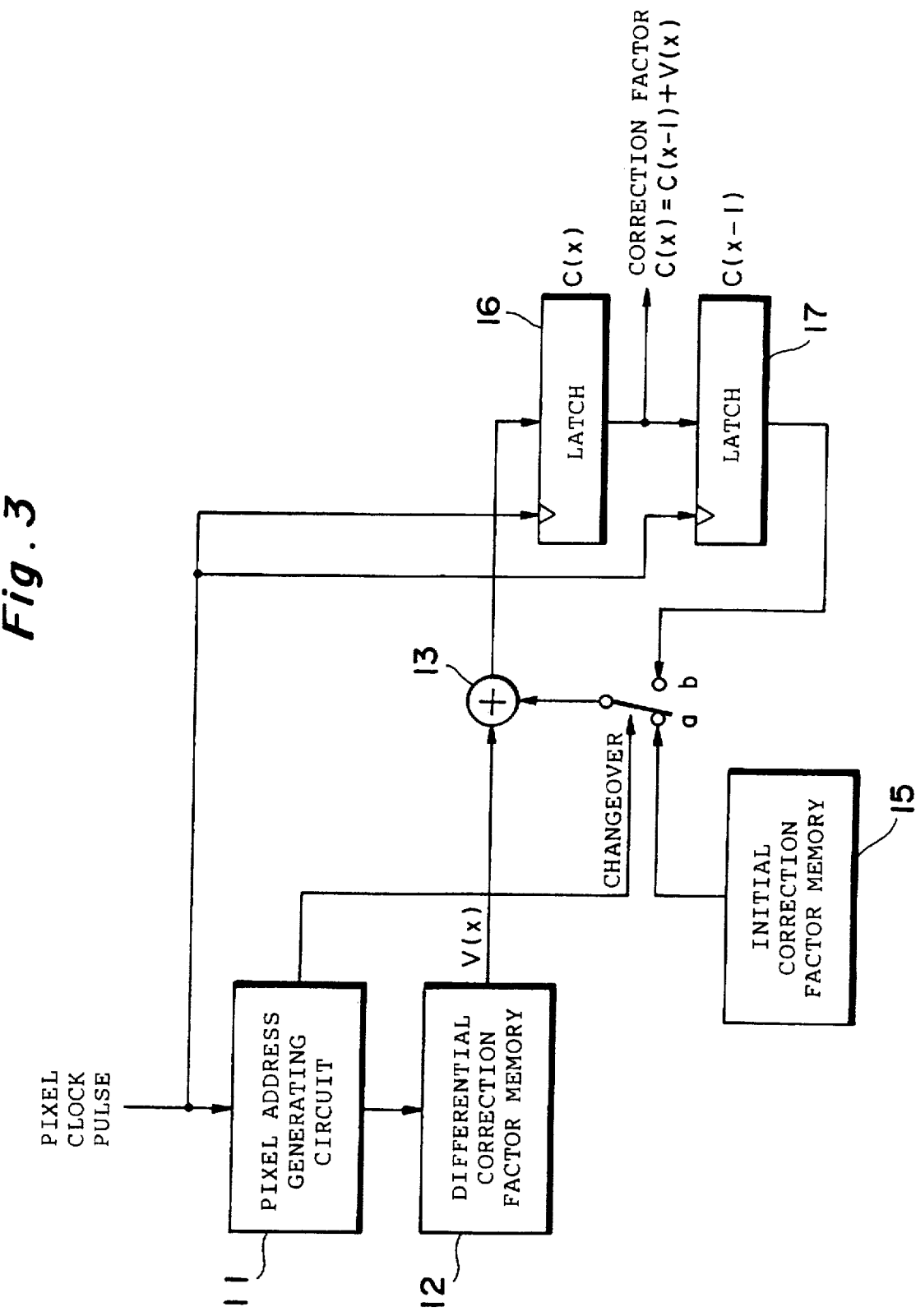
FIG. 3 is a block diagram showing the electrical construction of a correction factor generating circuit.
Figure 4:
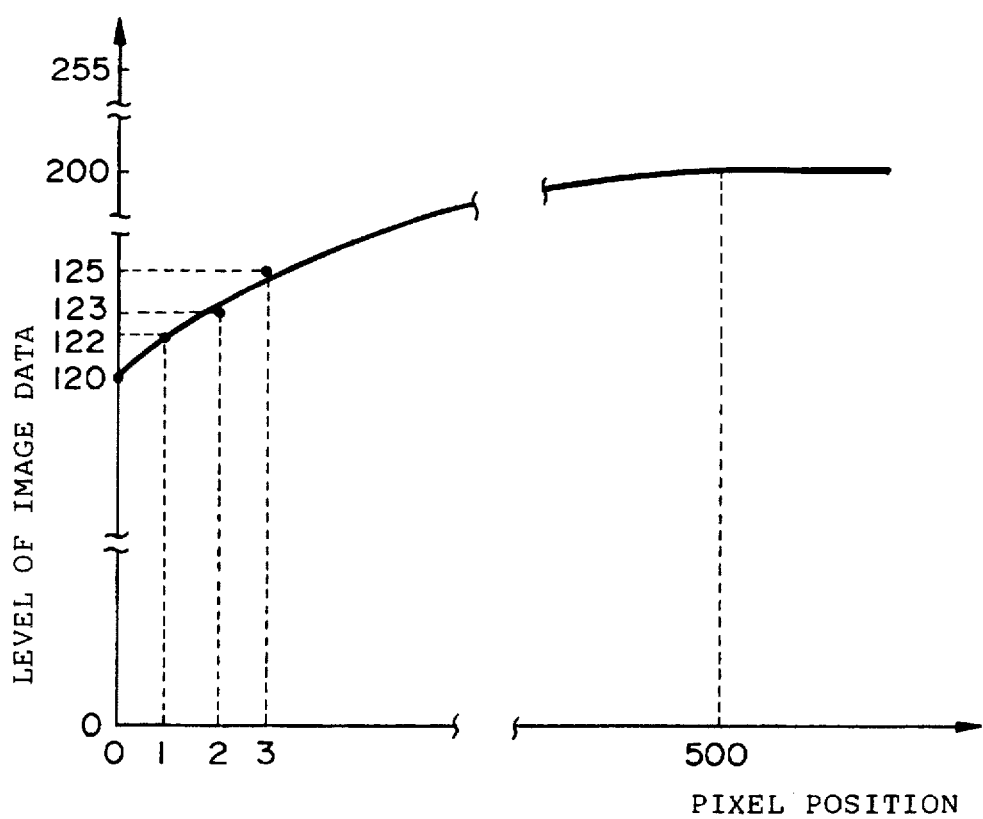
FIG. 4 illustrates the level of input image data.
Figure 5:
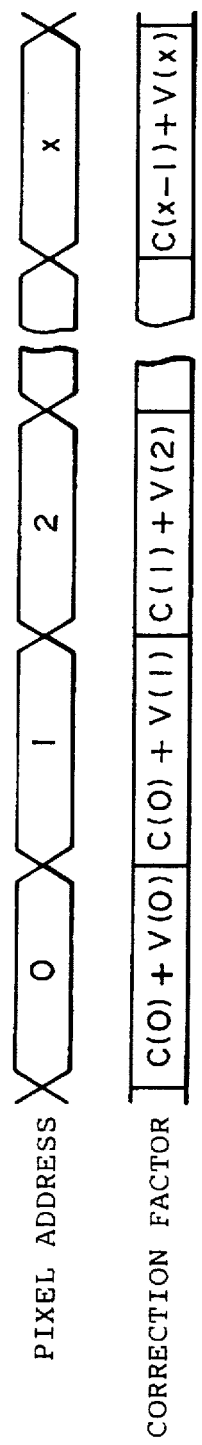
FIG. 5 illustrates the relationship between a pixel address and a correction factor.

FIG. 3 is a block diagram showing the electrical construction of the correction factor generating circuit 10; FIG. 4 illustrates the level of input image data obtained by imaging a reference object; and FIG. 5 illustrates the relationship between a pixel address and a shading correction factor.

In the correction factor generating circuit 10, data representing a differential correction factor which is equal to the difference between shading correction factors for adjacent pixels is previously stored for each pixel in a memory; the data representing a differential correction factor for image data of one pixel is read out in synchronization with a pixel clock pulse; the differential correction factor data read out is added to data representing a shading correction factor for image data of the preceding pixel; and the result of the addition is outputted as data representing a shading correction factor for the image data of the one pixel. The shading correction factor data thus obtained is held during one pixel clock pulse, and the held shading correction factor data is fed back in order to calculate a shading correction factor for the succeeding pixel.

The correction factor generating circuit 10 comprises a differential correction factor memory 12. Data representing the difference between a shading correction factor for a pixel at an address "x−1" and a shading correction factor for a pixel at an address "x" adjacent thereto is previously stored as a differential correction factor V(x) for the pixel addressed by "x". The shading correction factors are created on the basis of image data obtained by imaging a reference object, the surface of which is uniform in luminance or lightness.

The data representing the differential correction factor V(x) may be stored in the differential correction factor memory 12 in the following manner. The level of the image data obtained by imaging the reference object, the surface of which is uniform in luminance or lightness and the level of ideal image data which is to be inherently obtained when the reference object is imaged are compared, to find a shading correction factor for each and every pixel of the image. For each pixel, a differential correction factor representing the difference between a shading correction factor for the pixel and a shading correction factor for a pixel adjacent thereto (the preceding pixel) is then calculated. The differential correction factor thus calculated is stored in the differential correction factor memory 12 so as to have a correspondence with the pixel.

A pixel clock pulse outputted from a clock generator (not shown) is fed to a pixel address generating circuit 11, where a pixel address signal is generated and outputted in synchronization with the pixel clock pulse. The pixel address signal outputted from the pixel address generating circuit 11 is fed to the differential correction factor memory 12. Consequently, data representing a differential correction factor V(x) for a pixel corresponding to the pixel address represented by the pixel address signal is outputted from the differential correction factor memory 12 and is given to an adding circuit 13.

The correction factor generating circuit 10 further comprises a changeover switch 14 which is so controlled as to allow switching between a terminal a and a terminal b on the basis of the pixel address signal outputted from the pixel address generating circuit 11. The correction factor generating circuit 10 further comprises an initial shading correction factor memory 15 storing an initial shading correction factor C(0). The initial shading correction factor C(0) stored in the initial correction factor memory 15 is given to the terminal a of the changeover switch 14.

The changeover switch 14 is connected to the terminal a when the pixel address signal outputted from the pixel address generating circuit 11 represents addresses "0" and "1" (decimal number), while being connected to the terminal b in the other addresses.

When the pixel address is "0", the initial shading correction factor C(0) and a differential correction factor V(0) corresponding to a pixel addressed by "0" are added up by the adding circuit 13, and the result of the addition is outputted. The differential correction factor V(0) corresponding to the pixel addressed by "0" is zero, whereby the initial shading correction factor C(0) eventually becomes an output of the adding circuit 13.

Output data of the adding circuit 13 is fed to a first latch circuit 16. The pixel clock pulse is fed to the first latch circuit 16. The first latch circuit 16 holds the data fed from the adding circuit 13 for each input of the pixel clock pulse. The data held in the first latch circuit 16 is outputted as a shading correction factor C(x).

The data representing shading correction factor outputted from the first latch circuit 16 is also given to a second latch circuit 17. The pixel clock pulse is also fed to the second latch circuit 17. The second latch circuit 17 holds the data representing the shading correction factor outputted from the first latch circuit 16 for each input of the pixel clock pulse. The data representing the shading correction factor held in the second latch circuit 17 is given to the terminal b of the changeover switch 14.

When the pixel address outputted from the pixel address generating circuit 11 is "0", C(0)+V(0), that is, C(0) is outputted from the adding circuit 13 and is outputted as a shading correction factor C(0) through the first latch circuit 16.

When the pixel address represented by the pixel address signal outputted from the pixel address generating circuit 11 becomes "1", data representing a value C(0)+V(1) is outputted from the adding circuit 13 and is outputted as a shading correction factor C(1) for image data of a pixel addressed by "1" through the first latch circuit 16. The data representing the shading correction factor C(1) for the image data of the pixel addressed by "1" is held in the second latch circuit 17.

When the pixel address represented by the address signal outputted from the pixel address generating circuit 11 becomes "2", the changeover switch 14 is connected to the terminal b, whereby data representing the sum of the correction factor C(1) held in the second latch circuit 17 and a differential correction factor V(2) is outputted from the adding circuit 13. Data representing a value C(1)+V(2) is outputted as a shading correction factor C(2) for image data of a pixel addressed by "2" through the first latch circuit 16.

A shading correction factor C(x) for image data of a pixel at a pixel address "x" is thus obtained by adding a differential correction factor V(x) for the image data of the pixel at the pixel address "x" to a shading correction factor C(x−1) at an address "x−1" preceding the pixel address "x". Memories required to calculate a shading correction factor are only the differential correction factor memory 12 and the initial correction factor memory 15. The differential correction factor is data of approximately three bits. Thus the correction factor generating circuit 10 can be constructed using small-capacity memories.

The data representing shading correction factor C(x) outputted from the correction factor generating circuit 10 is given to the multiplying circuit 5 as shown in FIG. 1, to obtain image data Dr(x) after shading correction.

Referring now to FIG. 4, a shading correction factor is calculated using specific numerical values.

As shown in FIG. 4, the minimum level and the maximum level of image data are respectively taken as 0 and 255, and the level of ideal image data to be obtained by imaging a reference object, the surface of which is uniform in brightness or lightness, is taken as 200. The levels of image data at a pixel address "0", image data at a pixel address "1", image data at a pixel address "2" and image data at a pixel address "3" are respectively taken as 120, 122, 123 and 125.

Consequently, shading correction factors C(0), C(1), C(2) and C(3) for the image data at the pixel addresses "0", "1", "2" and "3" are respectively obtained on the basis of Equations (0), (1), (2) and (3). The shading correction factor C(x) is obtained by so multiplying by 128 in Equations (0) to (3) as to have 8-bit significant digits:

$$C(0) = 200/120 \times 128 = 213 \qquad \text{Eq.(0)}$$

$$C(1) = 200/122 \times 128 = 210 \qquad \text{Eq.(1)}$$

$$C(2) = 200/123 \times 128 = 208 \qquad \text{Eq.(2)}$$

$$C(3) = 200/125 \times 128 = 205 \qquad \text{Eq.(3)}$$

In the same manner as those in Equations (0) to (3), the shading correction factor C(x) is calculated with respect to image data of all pixels.

A differential correction factor V(x) is then calculated from the shading correction factor C(x).

The difference between shading correction factors C(x) for two adjacent pixels is calculated, to thereby obtain the differential correction factor V(x). A differential correction factor V(0) for the image data at the pixel address "0" is 0. Differential correction factors V(1), V(2) and V(3) for the image data at the pixel addresses "1", "2" and "3" are respectively obtained on the basis of Equations (4), (5) and (6):

$$V(1) = C(1) - C(0) = -3 \qquad \text{Eq. (4)}$$

$$V(2) = C(2) - C(1) = -2 \qquad \text{Eq. (5)}$$

$$V(3) = C(3) - C(2) = -3 \qquad \text{Eq. (6)}$$

In the same manner as those in Equations (4) to (6), the differential correction factor V(x) is calculated with respect to all the other pixels. Data representing the calculated differential correction factor V(x) is stored in the differential correction factor memory 12.

With respect to the pixel address "0", the data representing the shading correction factor C(0) stored in the initial correction factor memory 15 is outputted as is from the correction factor generating circuit 10. The shading correction factor C(0) is divided by 128 in the dividing circuit 6, and the result of the division is given to the multiplying circuit 5. The correction factor C(0) is divided by 128 in the dividing circuit 6 in order to return the shading correction factor C(0) obtained by multiplying by 128 in shading correction factor C(x) calculation processing represented by Equations (0) to (3) to its original value.

Data outputted from the dividing circuit 6 is fed to the multiplying circuit 5, where the input image data D(x) is multiplied by the data so that the input image data D(x) is subjected to shading correction. Image data Dr(0) after the shading correction is obtained on the basis of Equation (7)

$$Dr(0)=D(0) \times C(0)/128=120 \times 213/218=200 \qquad \text{Eq. (7)}$$

Similarly, image data Dr(1), Dr(2) and Dr(3) after shading correction of the image data at the pixel addresses "1 ", "2" and "3" are respectively obtained on the basis of Equations 8, 9 and 10:

$$Dr(1)=Di(1) \times C(1)/128=122 \times 210/128=200 \qquad \text{Eq. (8)}$$

$$Dr(2)=Di(2) \times C(2)/128=123 \times 208/128=200 \qquad \text{Eq. (9)}$$

$$Dr(3)=Di(3) \times C(3)/128=125 \times 205/128=200 \qquad \text{Eq. (10)}$$

All the levels of the image data after shading correction become approximately 200 in Equations (7) to (10), which are approximately equal to the level of the ideal image data which is to be obtained by imaging the reference object. The image data at all the pixel addresses are subjected to shading correction in the same manner as those in Equations (7) to (10).

Parts or all of the functions of the multiplying circuit 5 and the dividing circuit 6 in FIG. 1 and the functions of the adding circuit 13, the latch circuits 16 and 17 and the changeover switch 14 can be also realized by software.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A shading correction apparatus, for performing shading correction on input image data using a correction factor representing a ratio of ideal image data to image data obtained by imaging a reference object, comprising:

a first storing device for storing an initial correction factor;

a second storing device for storing a differential correction factor for each pixel of an input image, representing a difference between a shading correction factor for the pixel and a shading correction factor for an adjacent pixel;

a temporary holding device for temporarily holding a calculated correction factor;

an adding device for calculating, for each pixel, a sum of the differential correction factor stored in said second storing device and one of the initial correction factor stored in said first storing device and the calculated correction factor held in said temporary holding device, for outputting a result of the calculation as a correction factor, and for causing said temporary holding device to hold the result of the calculation; and a multiplying device for multiplying data, representing the calculation result outputted by the adding device, and the input image data for each pixel together to produce shading corrected image data.

2. An apparatus for performing shading correction using a correction factor representing a ratio of ideal image data and reference image data, comprising:

a first memory storing at least one initial correction factor;

a differential correction factor memory storing, for each pixel of an input image, a differential correction factor representing a difference between a shading correction factor for the pixel and a shading correction factor for an adjacent pixel and outputting the stored differential correction factor in synchronization with a pixel clock pulse;

adding circuit for adding the differential correction factor read out from said differential correction factor memory one of an initial correction factor and a preceding correction factor, and outputting the result of the addition as a correction factor;

correction factor holding circuit for holding the correction factor outputted from said adding circuit during the pixel clock pulse;

feedback circuit for inputting the correction factors, outputted from said correction factor holding circuit, as the preceding correction factor to said adding circuit; and a multiplexer for multiplying data, representing the correction factor output from the adding circuit, and the input image data for each pixel together to produce shading corrected image data.

3. A method for performing shading correction, using a correction factor representing a ratio of ideal image data and reference image data, comprising the steps of:

storing data representing an initial correction factor and storing, for each pixel data of an input image, a differential correction factor representing a difference between a shading correction factor for the pixel and a shading correction factor for an adjacent pixel;

successively reading out said stored data representing the differential correction factor for each successive pixel;

adding the read out data representing the differential correction factor and one of the stored data representing the initial correction factor and data representing a preceding correction factor;

outputting data obtained by the adding as data representing a correction factor;

feeding back the data obtained by the adding as data representing the preceding correction factor for said adding step; and multiplying the output corresponding correction factor and the input image data for each pixel together to produce shading corrected image data.

* * * * *